(12) United States Patent
Williams

(10) Patent No.: US 6,553,836 B2
(45) Date of Patent: Apr. 29, 2003

(54) SURFACE ACOUSTIC WAVE (SAW) ACCELEROMETER

(76) Inventor: John T. Williams, 12832 47$^{th}$ Dr. NE., Marysville, WA (US) 98271

( * ) Notice: Subject to any disclaimer, the term of this patent is extended or adjusted under 35 U.S.C. 154(b) by 68 days.

(21) Appl. No.: 09/901,946

(22) Filed: Jul. 9, 2001

(65) Prior Publication Data

US 2002/0014119 A1 Feb. 7, 2002

Related U.S. Application Data

(60) Provisional application No. 60/219,982, filed on Jul. 21, 2000.

(51) Int. Cl.$^7$ .............................................. G01P 15/08
(52) U.S. Cl. ................... 73/514.28; 310/313 R
(58) Field of Search .................. 73/514.28, 504.01; 310/313 R, 313 A, 313 B; 333/193

(56) References Cited

U.S. PATENT DOCUMENTS

| | | | | |
|---|---|---|---|---|
| 4,333,342 A | * | 6/1982 | Gilden et al. ............ | 73/514.12 |
| 4,346,597 A | * | 8/1982 | Cullen ..................... | 73/510 |
| 4,676,104 A | * | 6/1987 | Cullen ..................... | 73/514.12 |
| 5,345,201 A | * | 9/1994 | Greer et al. ............... | 333/193 |

* cited by examiner

Primary Examiner—Richard A. Moller

(57) ABSTRACT

A monolithic low cost, high frequency surface acoustic wave (SAW) accelerometer is provided that is operable in high impact and vibration applications.

20 Claims, 4 Drawing Sheets

SURFACE ACOUSTIC WAVE (SAW) ACCELEROMETER

This application claims the benefit of U.S. Provisional Application Ser. No. 60/219,982, filed date Jul. 21, 2000 filed in the name of John T. Williams on SAW Accelerometer, the complete disclosure of which is incorporated herein by reference.

FIELD OF THE INVENTION

The invention relates to shock and vibration resistant tactical grade accelerometers, particularly high frequency surface acoustic wave (SAW) accelerometers.

BACKGROUND OF THE INVENTION

Modem resonating beam force sensing technology is an accepted and widely-used in high precision accelerometer design. Such accelerometers, however, are relatively costly to manufacture, and are susceptible to damage from high shock or vibration loads. Presently, there are numerous applications for a lower cost, high precision accelerometer that is rugged enough withstand high g-loading associated with extreme shock and vibration. For example, gun-fired military munitions which typically experience firing shocks on the order of 15,000 to 20,000 g's could be designed for greater accuracy using guidance systems contained within the munitions. An accelerometer within munitions must meet high g-load and high precision demands, while remaining inexpensive enough to be expendable. In another example, extremely high accelerations are experienced in an aircraft crash. Recording deceleration of an aircraft during a crash and the moments preceding could provide useful information in determining the cause of the crash. In yet another example, the impact of a meteorite on a spacecraft may typically provide accelerations far in excess of those a typical guidance accelerometer can sense and survive.

Generally, existing accelerometer and other displacement or strain sensing device encompass variety of structures and principles. Each approach has been found to have its particular merits; but many defects are also present, such as lack of sensitivity and reliability on the one hand, and fragility and high cost on the other. Some accelerometer arrangements, for example, require auxiliary equipment, such as feed back mechanisms for providing reliable calibration or a temperature compensation mechanism. Many such existing arrangements are inherently analog in nature and do not lend themselves directly to use in digital equipment. Mechanism size and weight often add additional constraints.

Surface acoustic wave (SAW) technology is used in devices such as oscillators and electronic filters. Such devices use a piezoelectric substrate to sense vibrations and convert sensed vibrations to electrical signals. Existing transducers employing SAW technology use relative changes in the acoustical propagation characteristics of surface waves traveling on opposite surfaces of a thin elastic cantilever beam to directly measure the degree of flexing or surface strain of the elastic member.

SAW transducers commonly employ a flexible cantilever formed of a suitable piezoelectric material, such as Y-cut quartz. In general, piezoelectric materials are operationally reversible in that an applied mechanical strain will produce an electrical output and in that any electrical signal input will produce a related mechanical strain effect in the piezoelectric material. As disclosed by Cullen in U.S. Pat. No. 4,346,597 entitled, DUEL RANGE, CANTILEVERED MASS ACCELEROMETER, issued Aug. 31, 1982, the complete disclosure of which is incorporated herein by reference, the cantilever is clamped at one end, and a relatively substantial proof mass is affixed at the undamped end. Acceleration or other physically applied forces directed to the proof mass at the undamped end flex the cantilever. Thus, the cantilever, which forms the basic structural member, does not significantly contribute to the sensitivity of the apparatus. Rather, the cantilever merely transmits the stress developed by forces on the proof mass to a sensing element affixed to a flexing surface of the cantilever. Measurement of the frequency of a SAW resonator electrode pattern affixed to the flexing surface yields a measure of strain of the cantilever resulting from forces applied to the proof mass.

SAW devices are known to generate an output signal that varies in frequency as a function of strain, rendering it easily adapted for use with digital processing circuits. Therefore, accelerometers employing surface acoustic wave effects are desirable in applications where digital computation is necessary, and real time processing delay constraints preclude conversion of various analog signals to digital form. Elimination of analog to digital converters is particularly desirable in applications such as guided munitions having weight, space and cost constraints.

Piezoelectric materials are also generally pyroelectric in nature: any change in the temperature of the piezoelectric material produces a corresponding electrical output. SAW devices are thus thermally sensitive in that relatively small changes in the ambient temperature generate electrical outputs that are sufficiently large enough to cause spurious readings from the accelerometer. Therefore, as disclosed by Kellet in U.S. Pat. No. 5,063,782, entitled ACCELEROMETER AND ASSOCIATED CONTROL CIRCUITS, issued Nov. 12, 1991, the complete disclosure of which is incorporated herein by reference, many existing SAW accelerometers are suitable only for use at low frequencies and in conditions where the significance of ambient temperature changes upon the output of an accelerometer is limited.

Therefore, there is a real need in many high impact and vibration applications for the features of an accelerometer which are achievable essentially only by an expendable, digital-compatible, highly force sensitive, yet thermally insensitive, SAW type of strain sensor.

SUMMARY OF THE INVENTION

The present invention is a resonating beam accelerometer that overcomes the limitations of the existing devices by providing a thermally insensitive, expendable, digital-compatible, highly force sensitive surface acoustic wave (SAW)-type strain sensor micromachined as a monolithic device with an integrally-formed, cantilever-style detector.

According to one aspect of the invention, the SAW accelerometer of the invention, the fragile vibrating tines of the existing devices are eliminated. Instead, the SAW accelerometer of the invention detects vibrations on the surface of a relatively robust crystalline block. In addition, according to the present invention, substantially identical patterns of surface acoustic wave delay lines or resonator electrode patterns are deposited directly on opposing surfaces of a resonating flexure portion the integrally formed cantilevered beam, thereby resulting in a monolithic device requiring few manufacturing steps. High performance with low manufacturing cost is thus achieved. Also, the SAW accelerometer is designed for use with standard common mode rejection techniques that will eliminate the effects of temperature, pressure and vibration on accelerometer performance.

According to one aspect of the invention, the SAW accelerometer of the invention provides a high nominal operating frequency that results in superior performance values over current accelerometer devices.

According to other aspects of the invention, the invention provides a monolithic high frequency surface acoustic wave (SAW) accelerometer formed of a frame formed in a substrate of piezoelectric material; an integral beam suspended by one end from an interior surface of the frame; substantially identical patterns of surface acoustic wave delay lines formed on opposing surfaces of the beam; and a digital processing circuit coupled to each of the patterns of surface acoustic wave delay lines.

According to one aspect of the invention, the patterns of surface acoustic wave delay lines are formed at a location on the beam adjacent to the suspended end, and the beam is optionally further formed with an integral proof mass portion spaced away from the suspended end. According to another aspect of the invention, the proof mass portion is dimensionally larger than the portion having the patterns of surface acoustic wave delay lines formed thereon, thereby increasing the sensitivity to a force, i.e., acceleration, input.

According to yet other aspects of the invention, a method for forming an accelerometer is provided, the method including forming a frame of a piezoelectric material; forming a cantilevered beam-shaped sensing member of the piezoelectric material integrally with the frame; depositing substantially identical patterns of surface acoustic wave delay lines on opposing surfaces of the beam; and connecting a circuit to each of the patterns of surface acoustic wave delay lines, the circuit adapted to apply a high frequency drive signal to each of the patterns of surface acoustic wave delay lines.

According to one aspect of the invention, the method further includes connecting a frequency detection circuit to each of the patterns of surface acoustic wave delay lines. Preferably, the circuit adapted to apply a high frequency drive signal to each of the patterns of surface acoustic wave delay lines includes the frequency detection circuit as a subpart thereof.

According to still another aspect of the invention, the method further includes optionally mass loading the sensing member with an integrally formed proof mass.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is a low cost, high frequency surface acoustic wave (SAW) accelerometer operable in high impact and vibration applications.

Figure 1A:
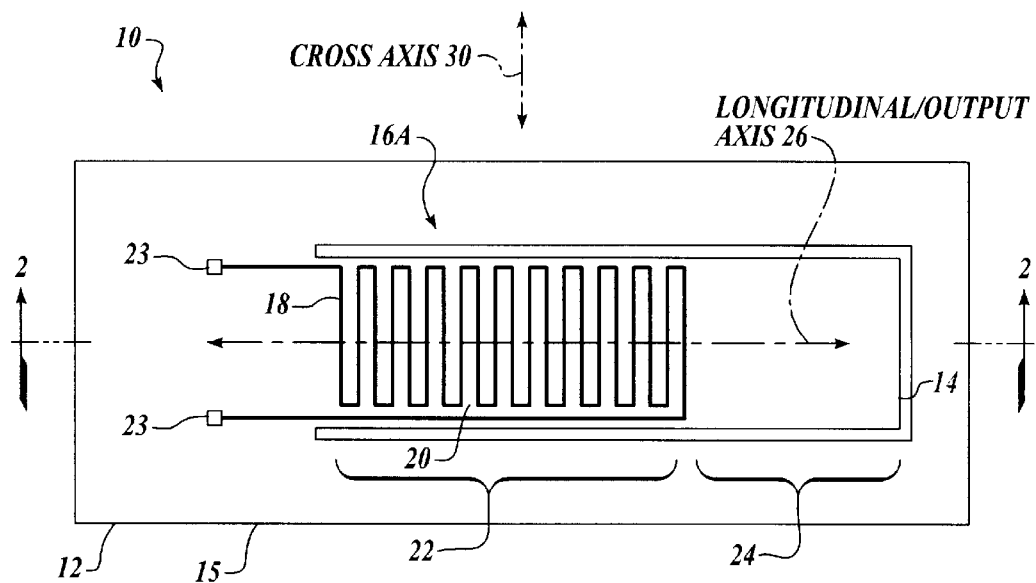
FIG. 1A is a top plan view and FIG. 1B is a bottom view, both of one embodiment of the SAW accelerometer of the invention.
Figure 1B:
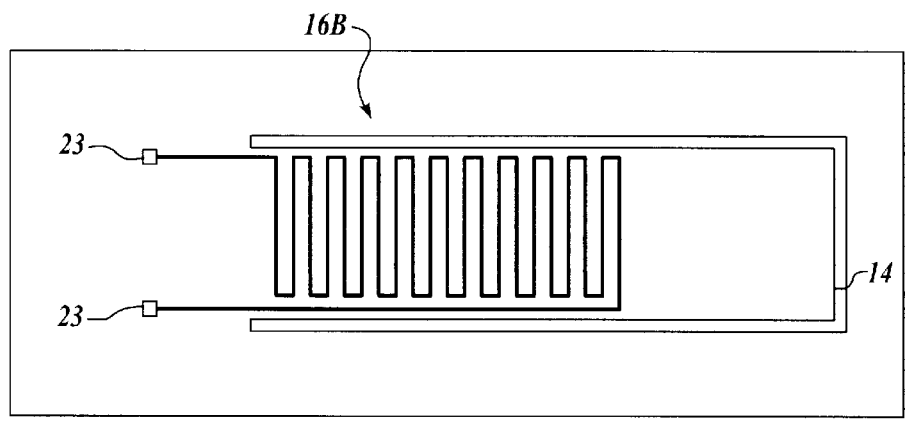

FIG. 1A is a top plan view of one embodiment of the SAW accelerometer of the invention and FIG. 1B is a bottom view. The accelerometer 10 is a truly monolithic device formed in a base substrate 12 of a suitable piezoelectric material such as quartz. At least one cantilevered beam 14 is formed integrally with base substrate 12 using well-known and widely available microstructuring techniques used in conventional silicon semiconductor processing. Such microstructuring techniques include, for example, etching, which is optionally performed using batch processing methods to limit costs. Other suitable but less cost-effective microstructuring methods are also known and are also contemplated by the invention. In wafer having a standard thickness of 525 microns, cantilevered beam 14 is, for example, on the order of about 25 to 40 microns thick. The remainder of substrate 12 defines a frame 15 surrounding cantilevered beam 14 and providing a rigid, integral support at one end.

Substantially identical patterns of surface acoustic wave delay lines 16A and 16B, also known as resonator electrode patterns 16A and 16B and referred to as such hereinafter, are deposited on a resonating portion 22 of at least two opposing surfaces of beam 14. Resonator electrode patterns 16A and 16B are configured as patterns of alternating of lines 18 and spaces 20. Electrode lines 18 are patterned in substantially parallel serially-interconnected lines of an electrically conductive material, such as gold, formed perpendicularly to the longitudinal axis of cantilevered beam 14. Resonator electrode patterns 16A on the top side of beam 14 are electrically isolated from other resonator electrode patterns 16B deposited on the opposite or bottom side of beam 14. Preferably, electrical connections 23 are provided on the surfaces of substrate 12 for each of resonator electrode patterns 16A, 16B for electrically interconnecting to drive and sense circuits (not shown).

The portion of beam 14 with resonator electrode patterns 16A, 16B applied thus becomes the flexure portion of resonating beam 14. In addition, a portion 24 of beam 14 devoid of an electrode pattern provides mass loading of resonating beam 14. Optionally, proof mass portion 24 is located at the undamped and unsupported end of beam 14 opposite the end rigidly supported by its integral connection to frame 15 defined by substrate 12.

Figure 2:
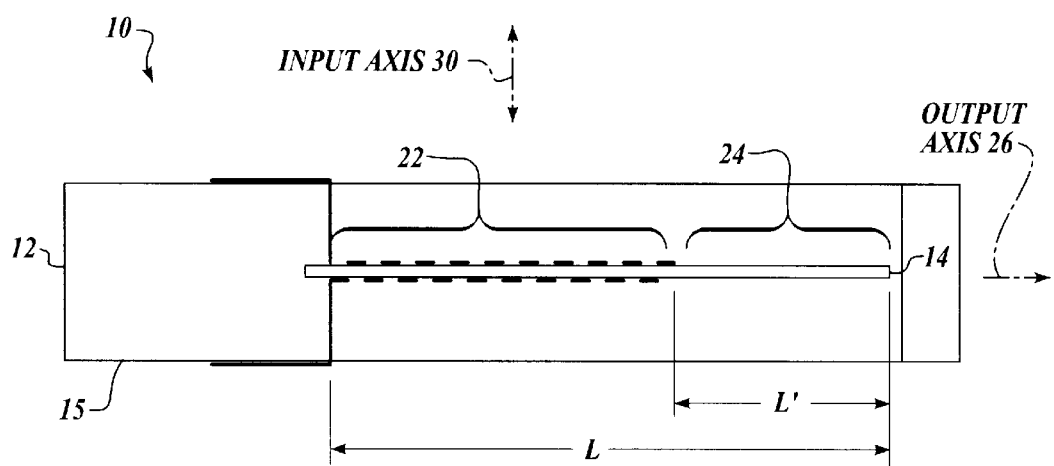
FIG. 2 illustrates a section view of the monolithic accelerometer of the invention shown in FIG. 1.
Figure 3A:
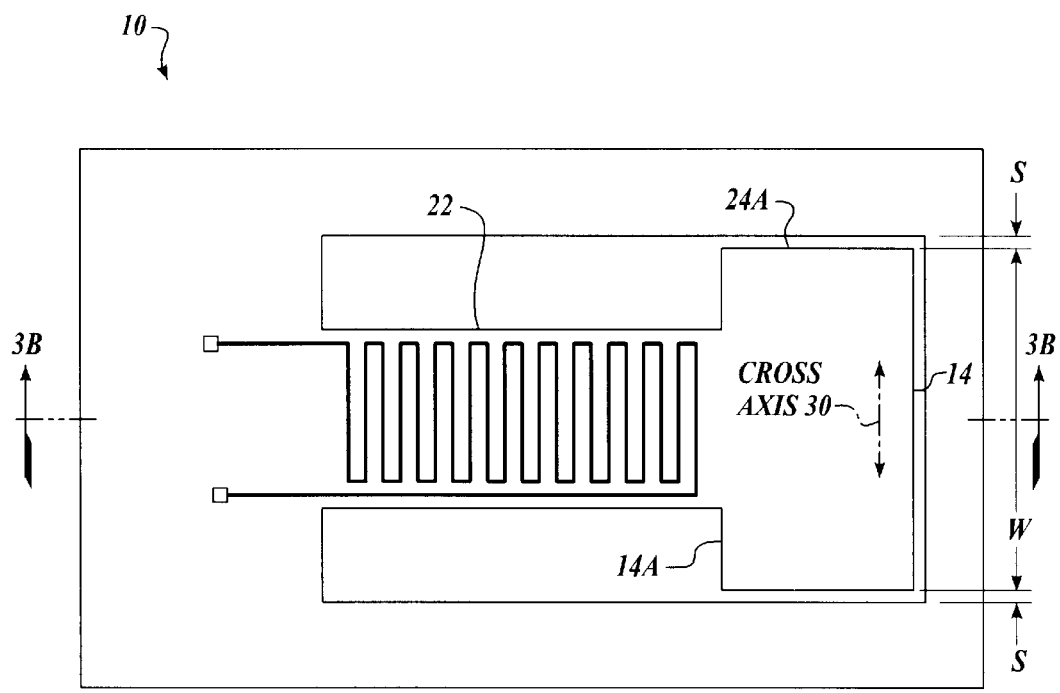
FIG. 3A illustrates a plan view and FIG. 3B illustrates a cross-sectional view of one alternative embodiment of the invention having increased sensitivity through addition of mass to undamped end of the flexure by increasing its width.
Figure 3B:
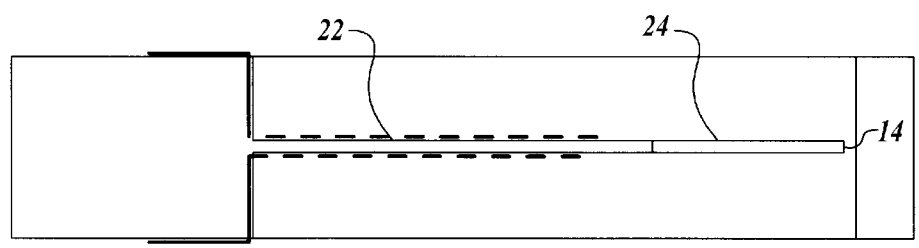

FIG. 2 illustrates a section view A—A of monolithic accelerometer 10 of the invention. As illustrated, resonating flexure beam 14 is preferably microsculptured with a reduced cross-section in the plane perpendicular to the input axis of accelerometer 10, thereby making proof mass portion 24 prone to motion along the output, or "sensing," axis 28, which results in flexure of cantilevered beam 14 along its longitudinal axis 26. Relatively larger cross-sectional dimensions in the longitudinal, or "input," 26 axis and cross axis 30 restrict off-axis signal generation. The Young's Modulus of the piezoelectric material of substrate 12 and the geometry of resonating flexure 14 determine the desired accelerometer operating parameters in obedience to the basic laws of Newtonian mechanics. Thus, the material and the dimensions, i.e., length, width, and thickness, of resonating portion 22 of cantilevered beam 14 are chosen to provide a flexural stiffness consistent with the g-range of the intended application.

SAW devices are known to generate an output signal that varies in frequency as a function of strain when the geometry of resonating flexure 14 is structured to bend in a predetermined axis relative to the resonator electrode patterns 16A, 16B. In particular, the SAW device of the invention generates an output signal that is proportional to strain in the resonating flexure 14, as measured by changes in the spacing of the geometry of the resonator electrode patterns 16A, 16B. This proportional output signal is directly adaptable for use with known digital processing circuits.

Direct adaptation to digital processing provides real time processing while eliminating the need for a costly analog-to-digital (A/D) conversion circuit. Elimination of analog-to-digital converters is particularly desirable in applications such as guided munitions having weight, space and cost constraints. Suitable digital processing circuits for use with the SAW device are well-known, but they are not discussed here as such processing circuit forms no part of this invention.

Operation of Accelerometer 10

In operation, acoustic surface waves of a very high frequency are induced in resonating portion 22 by application of a frequency signal in the MHz range to each of SAW devices defined by resonator electrode patterns 16A and 16B on the opposing top and bottom surfaces of beam 14. Spacings 20 between electrode lines 18 determine the nominal operating frequency of each SAW device.

As accelerometer 10 experiences an acceleration normal to the resonator electrode pattern surface, resonant portion 22 bends or flexes, thereby increasing electrode spacing 20 on the convex side of flexure 14, and decreasing the electrode spacing 20 on the concave side of flexure 14, as described by Cullen in above incorporated U.S. Pat. No. 4,346,597. As is known, quartz and other suitable piezoelectric materials each exhibit a phenomenon that flexure of a beam along an axis perpendicular to the pattern of electrode lines and spaces forming a SAW device formed thereon results in an alteration in the propagation velocity of acoustic surface waves at the surface thereof in the direction of the flexure. Therefore, flexure of resonant portion 22 of piezoelectric beam 14 along an axis perpendicular to the pattern of electrode lines 18 and spaces 20 of resonator electrode patterns 16A and 16B alters the propagation velocity of acoustic surface waves at the surface thereof in the direction of the flexure. Therefore, flexure of resonant portion 22 of beam 14 along its longitudinal axis 26 alters the propagation velocity of acoustic surface waves at the surface thereof in a direction orthogonal to flexure 14. The effect on the propagation velocity of the acoustic wave is of the same sense as the strain in the surface of beam 14. Thus, if undamped end portion 24 of cantilevered beam 14 is forced upwardly to bend the top surface of beam 14 in a concave fashion with respect to the plane of substrate 12 while bending the bottom surface in a convex fashion, the frequency increases in the top concave surface of beam 14 while the frequency decreases in the bottom convex surface. Because electrode spacing 20 determines the pattern frequency, the device will experience a slightly higher resonator frequency on concave top side of flexure 14, and a slightly lower frequency on convex bottom side. The changes in frequency in each of resonator electrode patterns 16A, 16B are proportional to the acceleration applied normal to the plane of the device as defined by the top and bottom surfaces of beam 14. Therefore, accelerometer 10 detects changes in acceleration as a function of changes in frequency in each of resonator electrode patterns 16A, 16B.

Preferably, substantially identical SAW devices are employed on opposing surfaces of beam 14 to exploit the opposing nature of the strain effects on opposing surfaces of flexure 14. Employing SAW devices formed of resonator electrode patterns 16A, 16B on opposing top and bottom surfaces of cantilevered beam 14 doubles the sensitivity by providing two additive measurements at the same strain. SAW devices formed of resonator electrode patterns 16A, 16B on opposing top and bottom surfaces of cantilevered beam 14 also provides cancellation of temperature effects. Each resonator electrode pattern 16A, 16B is sensitive to acceleration. Therefore, by arranging resonator electrode patterns 16A, 16B in this concave-convex, or "push-pull," configuration, using the difference between the two resonator frequencies as the output of SAW accelerometer 10 allows errors common to both resonator electrode patterns such as pressure or temperature effects to be rejected. Temperature effects are inherently in the same direction in both surfaces of beam 14. Therefore, subtraction of the two frequencies by nonlinear product mixing results in a difference frequency in which the temperature effect is cancelled. This push-pull arrangement also results in rejection of non-linearity in the response to bending of each resonator electrode pattern 16A, 16B, and therefore linearizes the output of accelerometer 10.

Operation of the SAW accelerometer 10 in the 1–3 MHz range results in a high scale factor, which provides superior resolution and accuracy. However, the SAW accelerometer 10 is optionally designed to operate in a higher or lower range.

Proof mass portion 24 is preferably located at the undamped end of beam 14, separate from resonating portion 22. Sensitivity of the device is optionally increased by increasing the length L of flexure 14, including the length L' of proof mass portion 24, or by adding mass to the undamped end of the device.

Alternative Embodiments

FIGS. 3A, 3B and 4A and 4B illustrate embodiments of the invention having increased sensitivity through addition of mass to undamped proof mass portion 24 of flexure 14. In the plan view of FIG. 3A, mass is added to the undamped end of flexure 14A to increase sensitivity by increasing width W of proof mass portion 24A within the plane of resonating portion 22 of flexure 14A. Spacing S between widened proof mass portion 24A and the surrounding portion of substrate 12 is preferably maintained at a predetermined minimum to cage the motion of flexure 14A along cross-axis 30. However, as shown in the side view of FIG. 3B, the thickness of the wider proof mass portion 24A is the same as the narrower portion resonating portion 22.

Figure 4A:
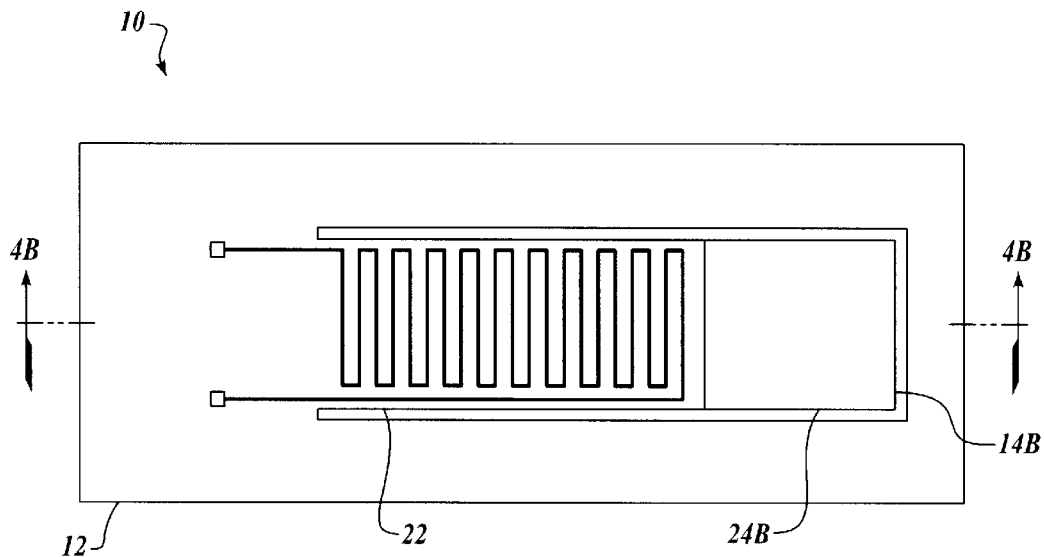
FIG. 4A illustrates a plan view and FIG. 4B illustrates a cross-sectional view of another alternative embodiment of the invention having increased sensitivity through addition of mass-to undamped end of the flexure by increasing its thickness.
Figure 4B:
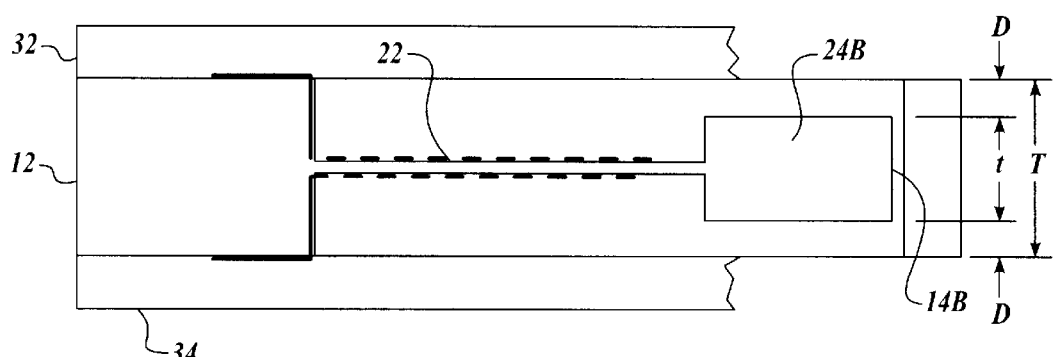

FIGS. 4A and 4B illustrate the adding of additional mass to the undamped end of flexure 14B without increasing the width of substrate 12 by allowing the thickness t of undamped proof mass portion 24B of flexure 14B to be greater than the thickness of resonant portion 22. For example, as shown in the side view of FIG. 4B, thickness t proof mass portion 24B is maintained at nearly the overall thickness T of substrate 12. Maintaining thickness t at nearly thickness T increases the mass at the undamped end of flexure 14B, thereby increasing output axis sensitivity. The closeness between the thickness t proof mass portion 24B and the overall thickness T of substrate 12 also provides for caging of flexure 14B in the event of shock or vibration inputs in excess of design limits. Thus, substrate 12 of SAW accelerometer is clamped along output axis 28 between two additional substrates 32, 34 that prevent more than a predetermined displacement D of flexure 14B relative to substrate 12.

While the preferred embodiment of the invention has been illustrated and described, it will be appreciated that various changes can be made therein without departing from the spirit and scope of the invention. For example, the embodiments of FIGS. 3 and 4 are optionally combined to provide a long, wide and thick proof mass portion 24 that provides maximum sensitivity, while cross-axis 30 and output axis 28 spacings S and D, respectively, effectively protect from excessive cross-axis and sensitive-axis inputs. Furthermore, accelerometer 10 of the invention is alternatively used in combination with one or more additional accelerometers 10 mounted orthogonally thereto to form a two- or three-dimensional acceleration sensing device for use in devices requiring multiaxial directional sensing and/or guidance.

What is claimed is:

1. A monolithic high frequency surface acoustic wave (SAW) accelerometer comprising:
    a substrate formed of a piezoelectric material, the substrate defining a frame;
    a beam formed integrally with the frame and suspended therefrom in cantilevered fashion, the beam defining a top and a bottom surface; and
    a resonator electrode pattern mounted on each of the top and bottom surfaces of the cantilevered beam, the resonator electrode patterns being electrically isolated one from the other.

2. The accelerometer recited in claim 1, further comprising a digital processing circuit electrically coupled to each of the resonator electrode patterns.

3. The accelerometer recited in claim 2, wherein the beam further comprises a resonant portion having the resonator electrode patterns mounted thereon, and a proof mass portion.

4. The accelerometer recited in claim 3, wherein the resonant portion of the beam is located adjacent to the frame.

5. The accelerometer recited in claim 4, wherein the resonator electrode patterns each further comprises a series of serially-interconnected substantially parallel and spaced apart electrodes formed normal to a longitudinal axis of the beam.

6. The accelerometer recited in claim 5, wherein the resonant portion of the beam further comprises length, width, and thickness dimensions selected in combination with the Young's Modulus of the piezoelectric material to result in a resonant frequency in the MHz range.

7. The accelerometer recited in claim 6, wherein the proof mass portion of the beam further comprises one or more of a length, width, and thickness dimension greater than the length, width, and thickness dimensions of the resonant portion.

8. A monolithic high frequency surface acoustic wave (SAW) accelerometer comprising:
    a substrate formed of a piezoelectric material, the substrate defining a frame;
    a cantilevered beam integrally formed of the frame and suspended by one end therefrom, the cantilevered beam defining two substantially flat and parallel opposing surfaces;
    a first pattern of interconnected substantially parallel and spaced apart electrode lines formed normal to the longitudinal axis of the cantilevered beam on a first of the surfaces; and
    a second pattern of interconnected substantially parallel and spaced apart electrode lines formed normal to the longitudinal axis of the cantilevered beam on a second of the surfaces and electrically isolated from the first pattern of electrode lines.

9. The accelerometer recited in claim 8, further comprising a digital processing circuit electrically coupled to each of the first and second patterns of electrode lines.

10. The accelerometer recited in claim 9, wherein the cantilevered beam further comprises a flexure portion adjacent to the frame having the first and second electrode patterns deposited thereon, and a proof mass portion at a distal end thereof.

11. The accelerometer recited in claim 10, wherein the electrodes of the first pattern are serially interconnected, and the electrodes of the second pattern are serially interconnected.

12. The accelerometer recited in claim 11, wherein the cantilevered beam further comprises a proof mass portion distal from the suspended end.

13. The accelerometer recited in claim 12, wherein the proof mass portion further comprises one or more of a dimension of length, width, and thickness greater than a respective length, width, and thickness dimension of the portion having the first and second electrode patterns deposited thereon.

14. A monolithic high frequency surface acoustic wave (SAW) accelerometer comprising:
    a frame formed in a substrate of piezoelectric material;
    an integral beam suspended by one end from an interior surface of the frame;
    substantially identical patterns of surface acoustic wave delay lines formed on opposing surfaces of the beam; and
    a digital processing circuit coupled to each of the patterns of surface acoustic wave delay lines.

15. The accelerometer recited in claim 14, wherein the patterns of surface acoustic wave delay lines are formed at a location on the beam adjacent to the suspended end, and the beam further comprises an integral proof mass portion spaced away from the suspended end.

16. The accelerometer recited in claim 15, wherein the proof mass portion is dimensionally larger than the portion having the patterns of surface acoustic wave delay lines formed thereon.

17. A method for forming an accelerometer, the method comprising:
    forming a frame of a piezoelectric material;
    forming a cantilevered beam-shaped sensing member of the piezoelectric material integrally with the frame;
    depositing substantially identical patterns of surface acoustic wave delay lines on opposing surfaces of the beam; and
    connecting a circuit to each of the patterns of surface acoustic wave delay lines, the circuit adapted to apply a high frequency drive signal to each of the patterns of surface acoustic wave delay lines.

18. The method recited in claim 17, further comprising connecting a frequency detection circuit to each of the patterns of surface acoustic wave delay lines.

19. The method recited in claim 18, wherein the circuit adapted to apply a high frequency drive signal to each of the patterns of surface acoustic wave delay lines further comprises the frequency detection circuit.

20. The method recited in claim 19, further comprising mass loading the sensing member with an integrally formed proof mass.

* * * * *